US012686158B2

(12) United States Patent
Gneuss et al.

(10) Patent No.: US 12,686,158 B2
(45) Date of Patent: Jul. 21, 2026

(54) FILTER DEVICE FOR PVC PLASTIC MELT FOR CONNECTION TO A TWIN SCREW EXTRUDER AND TWIN SCREW EXTRUDER FOR PVC PROCESSING

(71) Applicant: Gneuss GmbH, Bad Oeynhausen (DE)

(72) Inventors: Stephan Gneuss, Bad Oeynhausen (DE); Daniel Gneuss, Charlotte, NC (US); Detlef Gneuss, Carabietta (CH)

(73) Assignee: Gneuss GmbH, Bad Oeynhausen (DE)

( * ) Notice: Subject to any disclaimer, the term of this patent is extended or adjusted under 35 U.S.C. 154(b) by 77 days.

(21) Appl. No.: 18/792,530

(22) Filed: Aug. 1, 2024

(65) Prior Publication Data

US 2024/0391154 A1    Nov. 28, 2024

Related U.S. Application Data

(63) Continuation of application No. PCT/DE2023/100086, filed on Feb. 2, 2023.

(30) Foreign Application Priority Data

Feb. 7, 2022    (DE) ..................... 10 2022 102 820.8

(51) Int. Cl.
B29C 48/693        (2019.01)
B29C 48/40        (2019.01)
(Continued)

(52) U.S. Cl.
CPC ............ B29C 48/693 (2019.02); B29C 48/40 (2019.02); B29C 48/682 (2019.02);
(Continued)

(58) Field of Classification Search
CPC .. B29C 48/691; B29C 48/6914; B29C 48/693
See application file for complete search history.

(56) References Cited

U.S. PATENT DOCUMENTS

| | | | | | |
|---|---|---|---|---|---|
| 1,826,361 | A | * | 10/1931 | Mcneal | .................. B01D 33/15 |
| | | | | | 210/392 |
| 2,057,497 | A | * | 10/1936 | Mcneal | .................. B01D 33/15 |
| | | | | | 210/392 |

(Continued)

FOREIGN PATENT DOCUMENTS

| | | |
|---|---|---|
| CN | 203680783 U | 7/2014 |
| DE | 4018310 C1 | 5/1991 |

(Continued)

OTHER PUBLICATIONS

Machine translation of KR 101351216 B1, Clarivate Analytics. (Year: 2025).*

(Continued)

*Primary Examiner* — Emmanuel S Luk
(74) *Attorney, Agent, or Firm* — Muncy, Geissler, Olds & Lowe, P.C.

(57) ABSTRACT

A filter device for PVC plastic melt, for connection to a twin screw extruder. A housing has at least an inlet block with at least one inlet channel, and an outlet block with at least one outlet channel. At least one spacer element is arranged between the inlet block and the outlet block. A screen wheel is rotatably mounted in the housing. A plurality of screen points are each positioned between the inlet channel and the outlet channel and in each of which at least one screen element through which plastic melt can flow can be inserted. A drive device rotates the screen wheel in the housing. The inlet channel is formed in an inlet melt pocket in the inlet block, which has a twin extruder screw receptacle for two screw tips of two extruder screws to be arranged next to one another.

12 Claims, 8 Drawing Sheets

(51) Int. Cl.
    *B29C 48/68*      (2019.01)
    *B29C 48/691*    (2019.01)
    *B29K 27/06*     (2006.01)

(52) U.S. Cl.
    CPC ........ *B29C 48/6914* (2019.02); *B29C 48/402* (2019.02); *B29K 2027/06* (2013.01)

(56) References Cited

U.S. PATENT DOCUMENTS

| | | | | |
|---|---|---|---|---|
| 3,831,665 A * | 8/1974 | Knaus | ..................... | B29C 48/83 165/87 |
| 4,588,502 A * | 5/1986 | Zibell | ................. | B29C 48/6914 210/171 |
| 4,619,600 A * | 10/1986 | Gneuss | .............. | B29C 48/6914 210/791 |
| 4,710,288 A * | 12/1987 | Patrovsky | ............... | B29B 13/10 210/111 |
| 4,850,840 A * | 7/1989 | Gneuss | .............. | B29C 48/6914 425/185 |
| 5,090,887 A * | 2/1992 | Gneuss | .............. | B29C 48/6914 425/185 |
| 5,362,223 A * | 11/1994 | Gneuss | .............. | B29C 48/6914 425/185 |
| 5,449,458 A * | 9/1995 | Gneuss | .............. | B29C 48/6914 210/488 |
| 6,800,233 B2 * | 10/2004 | Golomb | .................. | B28B 3/206 264/211.21 |

| | | | | |
|---|---|---|---|---|
| 2002/0074278 A1 * | 6/2002 | Patrovsky | .............. | B01D 29/54 210/359 |
| 2008/0179261 A1 * | 7/2008 | Patrovsky | .......... | B29C 48/6914 210/324 |
| 2010/0276353 A1 * | 11/2010 | Patrovsky | .......... | B29C 48/6914 210/236 |
| 2016/0051915 A1 * | 2/2016 | Gneuss | ................ | B01D 33/804 210/791 |
| 2016/0059465 A1 * | 3/2016 | Gneuss | ................... | B29C 48/92 425/135 |
| 2019/0337215 A1 * | 11/2019 | Rosamond, III | ...... | B29C 48/693 |
| 2019/0344491 A1 * | 11/2019 | Gneuss | .............. | B29C 48/2568 |
| 2020/0143987 A1 * | 5/2020 | Amba | .................. | H01B 13/146 |
| 2020/0247009 A1 * | 8/2020 | Chung | ................. | B29C 48/405 |
| 2021/0170662 A1 * | 6/2021 | Gneuss | .............. | B29C 48/6912 |
| 2021/0170663 A1 * | 6/2021 | Gneuss | .............. | B29C 48/2725 |
| 2022/0242027 A1 * | 8/2022 | Schulz | ............... | B29C 48/6914 |
| 2025/0018633 A1 * | 1/2025 | Gneuss | .............. | B29C 48/2725 |

FOREIGN PATENT DOCUMENTS

| | | | | |
|---|---|---|---|---|
| DE | 4235523 C1 | 12/1993 | | |
| EP | 3160711 B1 | 11/2019 | | |
| KR | 101351216 B1 * | 1/2014 | .......... | B29C 48/693 |

OTHER PUBLICATIONS

International Search Report dated May 11, 2023 in corresponding application PCT/DE2023/100086.

* cited by examiner

100

12   40   41   31   42   30

16

52

15

11   50   51   201   202

1

FILTER DEVICE FOR PVC PLASTIC MELT FOR CONNECTION TO A TWIN SCREW EXTRUDER AND TWIN SCREW EXTRUDER FOR PVC PROCESSING

This nonprovisional application is a continuation of International Application No. PCT/DE2023/100086, which was filed on Feb. 2, 2023, and which claims priority to German Patent Application No. 10 2022 102 820.8, which was filed in Germany on Feb. 7, 2022, and which are both herein incorporated by reference.

BACKGROUND OF THE INVENTION

Field of the Invention

The invention relates to a filter device for PVC plastic melt and to a twin screw extruder for PVC processing.

Description of the Background Art

The processing of PVC artificial melt is demanding, as it chemically degrades when exposed to heat for too long. In the process, especially at temperatures of more than 180° C., hydrochloric acid can also be released, which has a corrosive effect on the processing plants. Therefore, the flow paths between the melting in the extruder and the discharge on a tool nozzle must always be kept short.

When recycling PVC, a filter device must be inserted between the extruder and the tool in order to filter conglomerates and foreign bodies from the plastic melt before they reach the nozzle or the rest of the tool. The inserted filter lengthens the flow paths and there is a risk of creating areas with insufficient flow in which plastic melt lingers for too long.

DE 42 35 523 C1, which is incorporated herein by reference, describes a screening device with a rotating screen disc. Openings in the housing and screen inserts in the screen disc have a circular base. In this process, the melt channel expands in a mouth area and forks in front of the screen disc so that it ends with two partial mouths at the dividing distance of the openings on the screen disc. At the rear, the partial currents reunite. However, this concept serves to increase throughput and is not intended for the filtration of PVC plastic melt provided by a twin screw extruder.

A similar concept of a filter device, in which the melt channel splits into two partial channels, which reunite behind the screen point, in front of the screen disc in the flow direction is disclosed in US 2008/179261 A1. Here, too, the suitability of the filter device in connection with a twin screw extruder is neither intended nor objectively given.

DE 40 18 310 C1, which is incorporated herein by reference, specifies a method for filtering plastic melts by means of a screen wheel filter device. In order to avoid chemical changes in the plastic melt in areas of the melt channel passing through the filter device with poor flow, it is provided that the plastic melt remaining in the screen chambers is pressed out by means of compressed gas and fed to the end of the melt channel on the outlet side before the cleaning or filter change position has been reached. The object of the invention is thus to specify a filter device for PVC plastic melt to be connected to a twin screw extruder, in which flow behavior is improved and whereby the risk of chemical change of the melt is reduced.

SUMMARY OF THE INVENTION

It is therefore an object of the invention to provide a filter device, whereby a screen wheel filter and the further approach of designing parts of the inlet side of such a filter device directly as part of the tip area of a twin screw extruder, so that the extruder screws can be inserted with their tips in the filter device.

For this purpose, an inlet melt pocket is formed in the inlet block, which has a twin extruder screw receptacle for two screw tips from two extruder screws to be arranged next to each other on an inlet side on the outer side of the housing, and which ends in an oval or elongated hole-shaped collection area in front of the screen wheel. The partial integration of the extruder into the filter device makes it possible to dispense with the tubular flange connections normally present with which a flow connection is usually made between a self-contained extruder and a self-contained filter device. The flow paths within the filter device are therefore particularly short in the invention, since the tips of the extruder screws can reach very close to the screen wheel with the screen elements inserted therein.

Another advantage of the invention is the simultaneous widening of the melt channel cross-section in the inlet melt pocket, both in the x and y directions. The widening is carried out relative to the inlet channel cross-section, the dimensions of which are determined by the geometry of the twin screw, and in particular with a relatively uniform widening horizontally and vertically, i.e., in the x and y directions. The advantage of this is that the flow is much more uniform than the well-known transition of the cross-section of a twin screw into a cylindrical flow channel and that the screen elements on the screen disc can have a smaller radial extension than a circular cross-section due to the lower height of the oval or the elongated hole. The radial expansion determines the screen wheel diameter and thus the overall size of the filter device, so that conversely, the size can be reduced by reducing the radial expansion.

The twin extruder screw receptacle at the inlet melt pocket can be formed by two cylinder bores that intersect laterally and are aligned parallel to each other, wherein the cross-section has the shape of a horizontal figure eight. This means that the circumference of the end sections of the satellite screws is enclosed in the same way as is the case within the extruder bore of the extruder.

Another example of the filter device is that the inlet melt pocket is formed in a channel bushing detachably connected to the inlet block and/or that the outlet melt pocket is formed in a channel bushing connected to the outlet block. This allows for the respective channel bushing to be quickly replaced for cleaning and cleaned outside the housing of the filter device.

This is a particular advantage because the funnel section widens from a smaller cross-section inlet opening towards the screen wheel, so that an undercut is created and cleaning of the funnel area would be difficult to clean through the inlet opening or after the filter device has been completely dismantled. If the channel bushing is removed, it can easily be cleaned on the inside. In addition, access to the screen disc during cleaning is facilitated when the channel bushing is removed.

In addition, the interchangeable channel bushings of the filter device make it easy to adapt the melt pockets to different screw geometries when using the same housing.

In order to avoid any increase in viscosity of the plastic melt due to cooling within the filter device, it is preferably provided that the inlet block and/or the outlet block be interspersed with flow channels for liquid temperature control. Heating is preferably carried out for a start-up process or during a downtime of the extrusion device.

The liquid temperature control not only makes it possible to heat up to the operating temperature, but also to cool it down. This allows for the heat generated by the frictional forces within the flowing melt to be dissipated. In this case, the area of the screw tip in the inlet—due to the shear energy introduced by the movement of the extended screws—and the passage through the filter element itself—high shear within the small openings in the screen element—are of particular importance. This means, for example, that the filter system can be integrated into an existing, already thermally optimized processing process without filtration, without the need to make fundamental changes to the upstream and downstream components. The additional amount of heat introduced by the filter element and, if necessary, a screw extension can be dissipated by the liquid temperature control.

Removable channel bushings also enable flexible adaptation to different extruders, but also to downstream tools, e.g., oval channels on the outlet side for subsequent wide slot tools or other geometry for profile tools adapted to the profile shape.

Furthermore, an example provides that the housing has at least one opening area at its top in which the screen wheel protrudes from the inlet block and the outlet block and in which at least one screen point on the screen wheel is accessible from outside the housing.

A twin screw extruder, which is particularly suitable for PVC processing, usually has an extruder housing with an extruder bore in which two axially parallel, rotary-driven extruder screws are arranged, wherein the extruder screws extend to a funnel zone at the end of the extruder bore, which is in flow connection with an extruder outlet opening.

According to the invention, it may be provided to integrate the filter device functionally directly with the twin screw extruder. For this purpose, it is also provided that a rotatably mounted screen wheel, which has a plurality of screen openings, in each of which at least one screen element through which plastic melt can flow can be inserted, is guided through the funnel zone in the front area of the extruder bore and divides it into two funnel zone sections.

Such a solution is provided by a twin screw extruder having the features of claim 8. In addition to a fully integrated variant of an extruder with a built-in screen wheel, it is also possible to combine a standard twin screw extruder with only a slight adjustment at the front with a filter device based on the invention. In this case, the screen wheel is a part of the filter device described above, which is firmly connected to the twin screw extruder, wherein the inlet melt pocket in the housing of the filter device forms an end section of the extruder bore.

Two tip extension elements for the extruder screws may also be provided, which are attached to the front of the actual extruder screws but no longer have screw flights. The tip extension elements are then pushed into the twin extruder screw receptacle instead of the actual extruder screw tips. The advantage is that with an existing twin screw extruder there is no need to shorten the extruder housing and there is no need to procure additional longer screws, so that the screws protrude a bit from the extruder bore with their tip area at the front and can engage with the twin extruder screw receptacle of the filter device.

The screen wheel can be driven via a freewheel or a pawl drive, wherein a drive lever engages in recesses on the outer edge of the screen disc.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
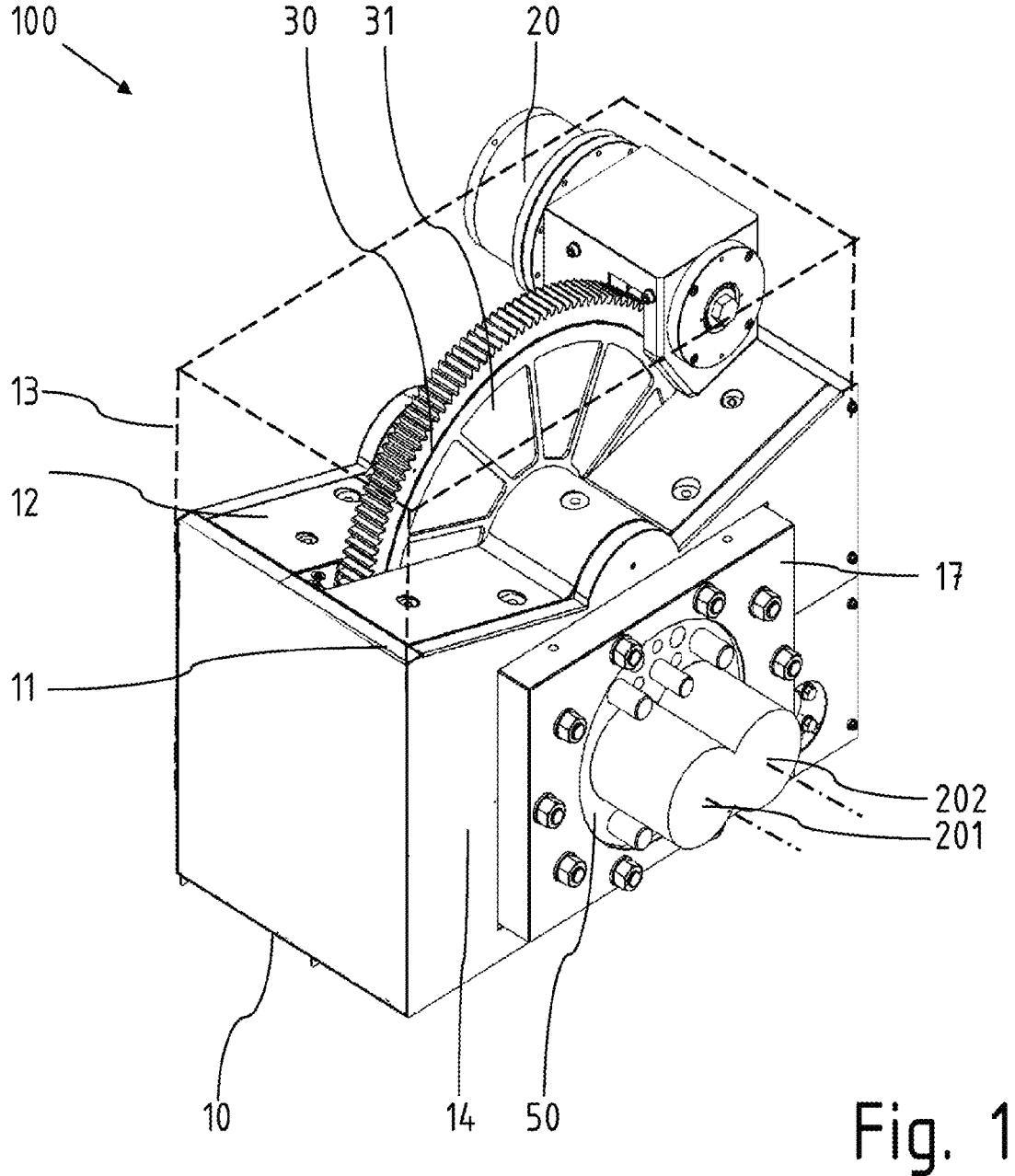
FIG. 1 shows a perspective view of a filter device.

FIG. 1 shows a perspective view of a filter device 100 with a housing 10, which is essentially formed by an inlet block 11 and an outlet block 12, and a rotatably mounted screen wheel 30 arranged between them. The screen wheel 30 is driven by a rotary drive 20.

The housing 10 is cuboid only in the lower area on its outer side. As indicated by the dotted lines, it does not extend enough upwards for the screen wheel 30 to be completely enclosed. Rather, an opening area 13 is formed by the dotted lines, in which, in the exemplary embodiment shown, four screen points 31 on the screen wheel 30 are freely accessible at the same time for maintenance purposes. Since a twin extruder screw receptacle is provided in the housing for the screw tips of two extruder screws 201, 202 and these must be arranged next to each other, it is advantageous to provide the opening area 13 at the top of the housing 10, as this allows for the housing dimensions to be smaller overall.

A special feature of the inventive filter device 100 can be seen when looking at the back 14 of the housing 10 shown in FIG. 1. Two extruder screws 201, 202 of a twin screw extruder are guided into an inlet melt pocket in the inlet block 11. The inlet melt pocket of the filter device 100 thus forms a part of the extruder bore of the twin screw extruder, which can be connected to the housing 10 of the filter device 100 via a flange 17.

Figure 2:
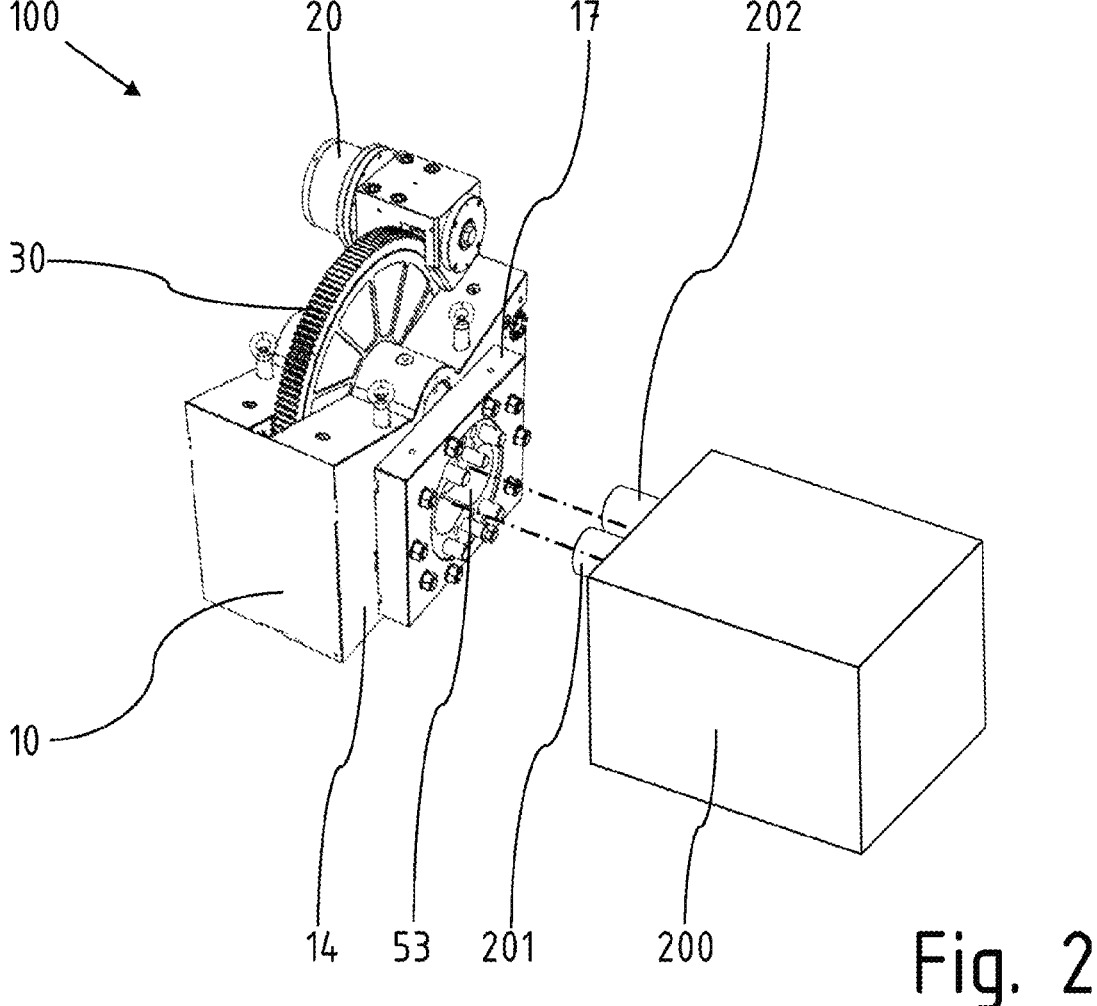
FIG. 2 shows a perspective view of the filter device with parts of a twin screw extruder.

FIG. 2 is a perspective view of the filter device 100 with a front part of a twin screw extruder 200 positioned in front of it, which is not yet connected to the flange 17 on the housing 10 of the filter device 100. A twin extruder screw receptacle 53 is visible in the central recess in the flange 17.

Figure 3:
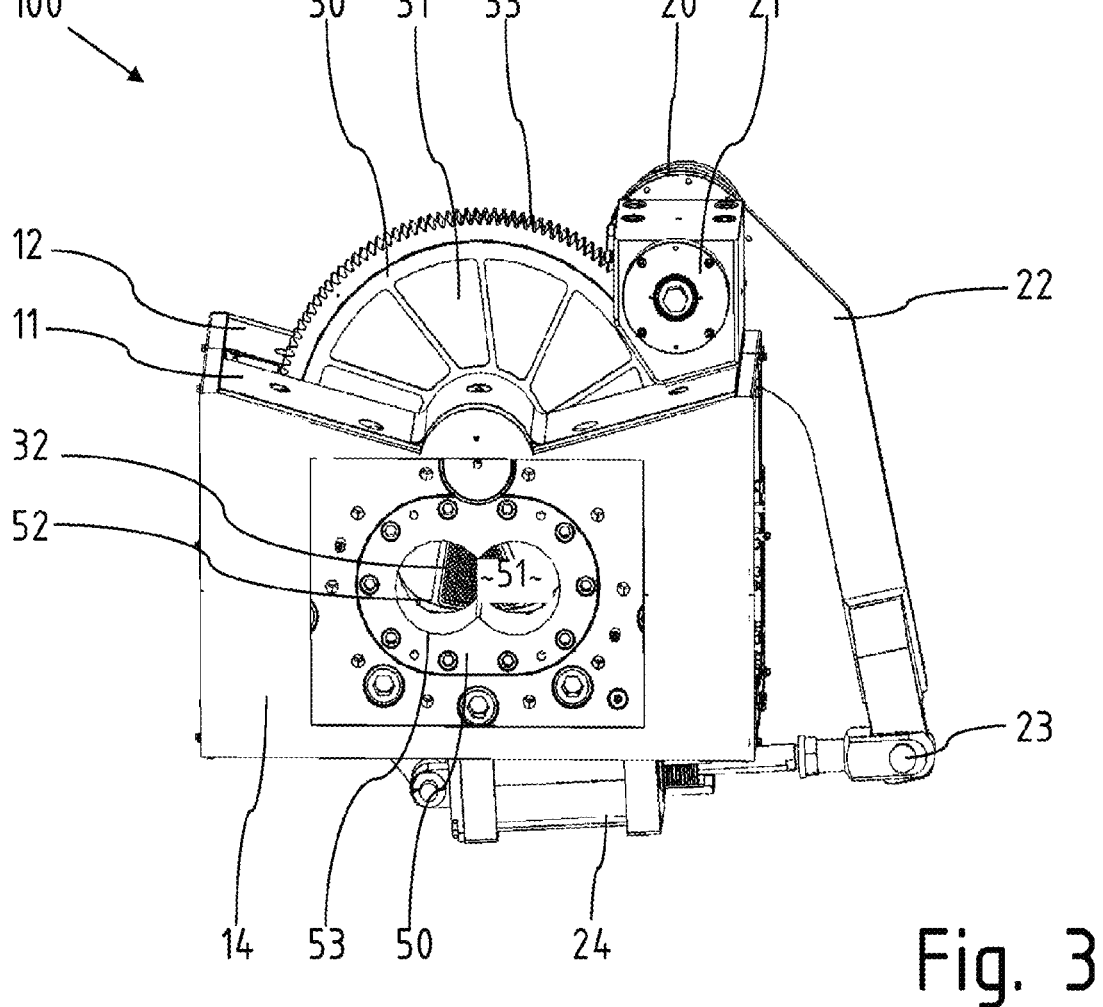
FIG. 3 shows the back of the filter device from diagonally above.

FIG. 3 shows the filter device 100 in perspective from the back 14 and without the flange 17. It is clearly visible that there is a greatly widened outlet channel here, which is designated as the inlet melt pocket 51. The inner contour of the inlet melt pocket 51, which is formed within a removable channel bushing 50, is adapted to the two intermeshing extruder screws and therefore initially has the shape of a horizontal figure eight in the area facing the outside of the housing. This area forms the twin extruder screw receptacle 53, which must be adapted to the external contour of the pair of extruder screws. Behind it is a funnel section 52, which leads to the screen elements 32 in the screen wheel 30.

The drive 20 is composed of a hydraulic cylinder 24, whose piston rod is connected by a joint 23 to a drive lever 22. The drive lever 22 is mounted on an axle 21 on the housing, which includes a freewheel, and is connected via the freewheel to a sprocket, which engages from the outside in a toothing 33 on the screen wheel 30.

Figure 4:
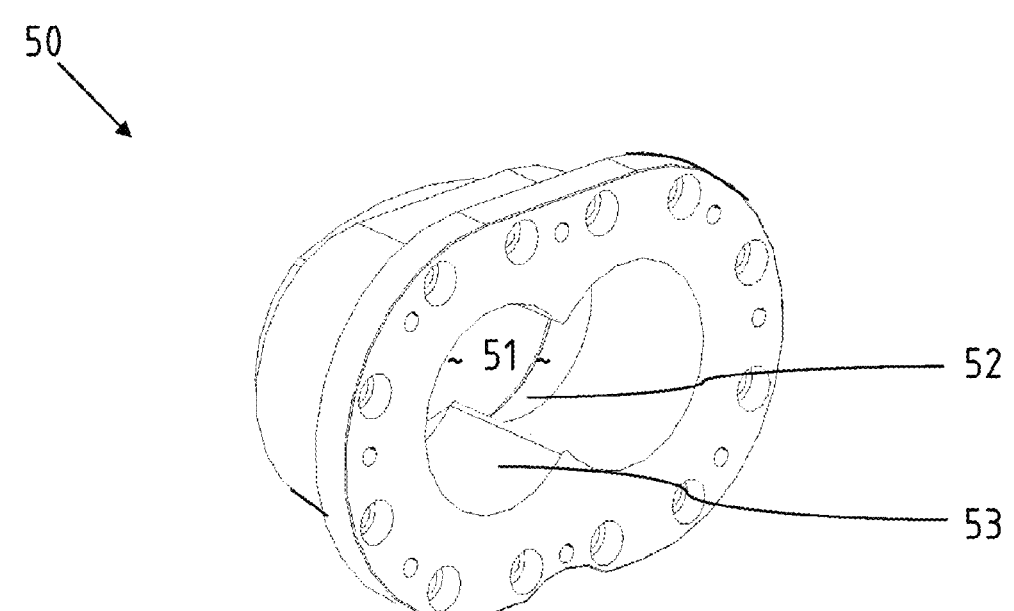
FIG. 4 shows a channel bushing in perspective view.

FIG. 4 shows in perspective a channel bushing 50 taken out of the inlet block 11, in which the inlet melt pocket 51 with its two sections 52, 53 is formed.

Figure 5:
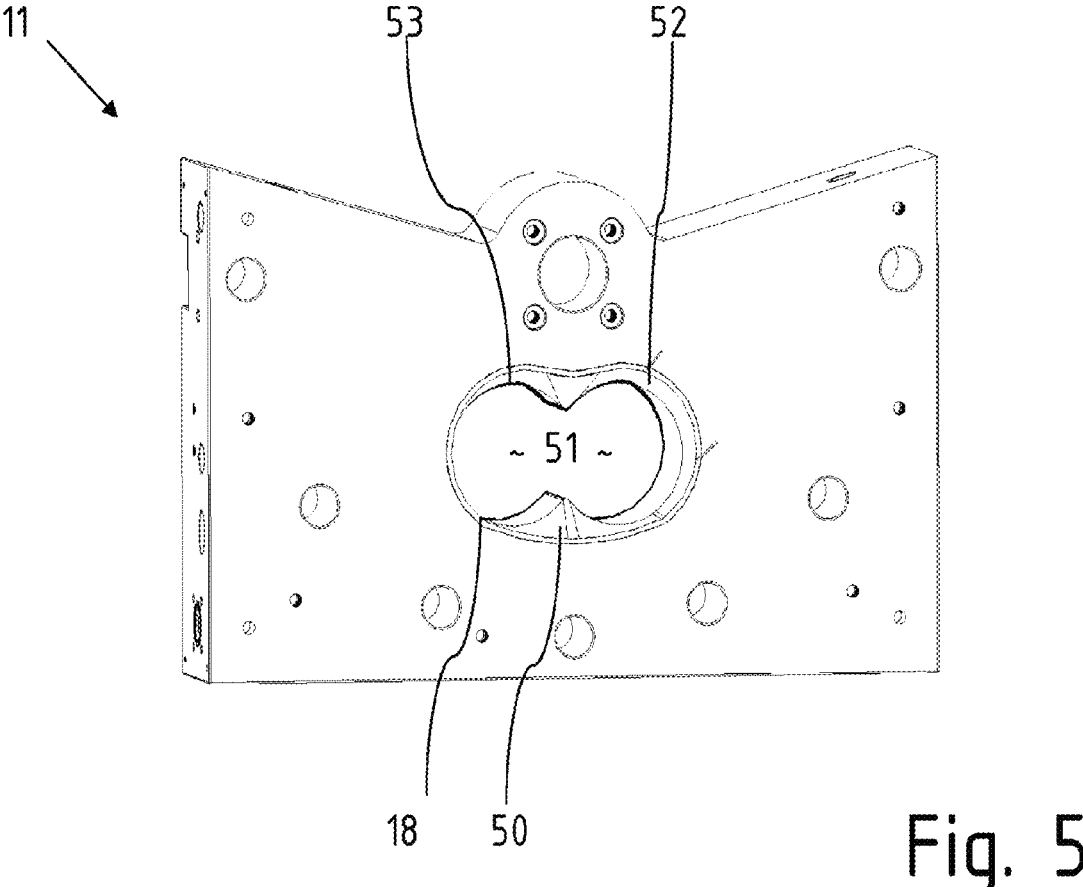
FIG. 5 shows an inlet block in perspective view.

FIG. 5 shows the inlet block 11 in perspective view, with a view from the inner side facing the screen wheel through the inlet melt pocket 51 to the outside. It can be seen here that the inlet block 11 has an opening 18 with a kidney-shaped contour, to which the channel bushing 50 inserted behind it in the inlet block 11, with its opening in the form of a horizontal figure eight, is seamlessly connected.

Figure 6:
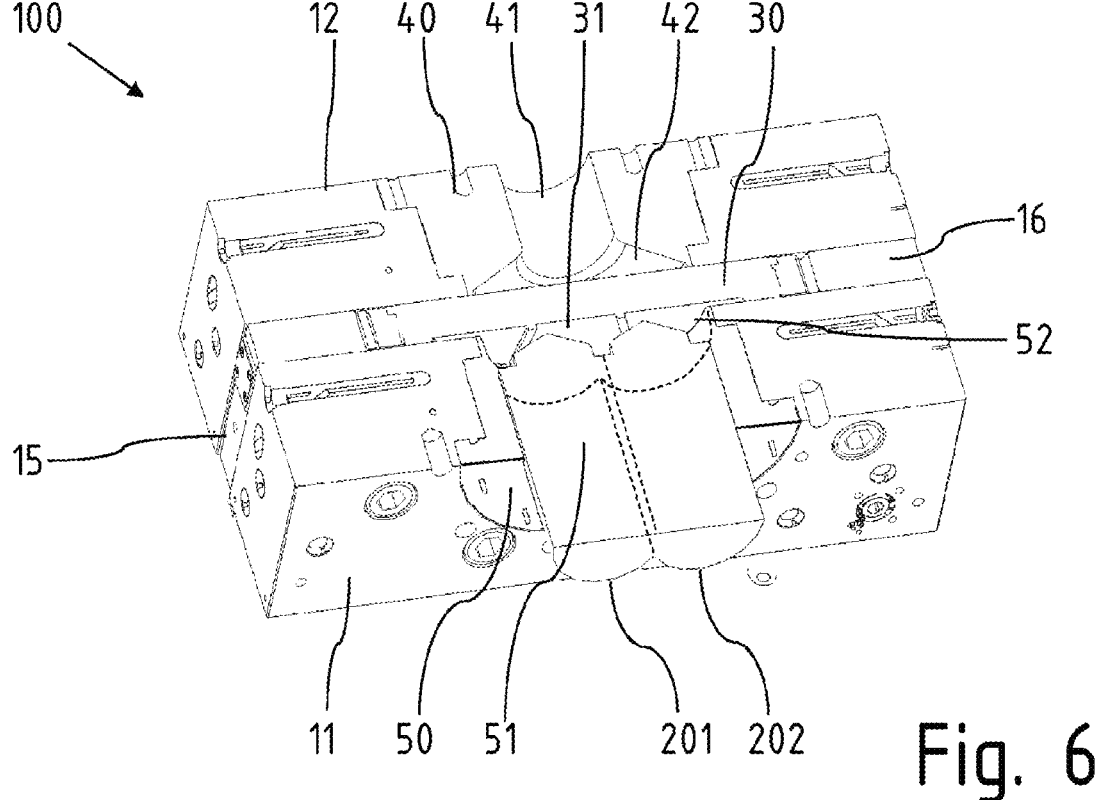
FIG. 6 shows a horizontal cut through the filter device.

FIG. 6 is a horizontal section through the filter device 100, wherein the cutting plane is arranged at the level of the tips of the extruder screws 201, 202, and is therefore arranged about halfway up the channel bushing 50 with the inlet melt pocket 51, which contains the funnel section 52.

On the outlet side behind the screen wheel 30, another channel bushing 40 is provided, which is inserted into the outlet block 12 and in which an outlet melt pocket is formed. The outlet melt pocket comprises a funnel section 42 located in front of the screen wheel 30, which is connected to a cylindrical outlet channel 41.

Due to the wide design of the funnel section 52 in the inlet melt pocket 51, the plastic melt conveyed by the two extruder screws 201, 202 can not only be distributed simultaneously to a plurality of screen points on the screen wheel 30, but it can also widen equally in both dimensions of the opening cross-section.

On the outlet side, the funnel section 42 ensures that the melt flowing from the several screen points 31 is concentrated again and fed into the outlet channel 41.

Spacer elements 15,16 are visible in the housing between the inlet block 11 and the outlet block 12, which between them enclose the rotatably mounted screen wheel 30 and serve to create a tight connection between the inlet block 11 and the outlet block 12, while at the same time preventing the screen wheel 30 from jamming.

Figure 7:
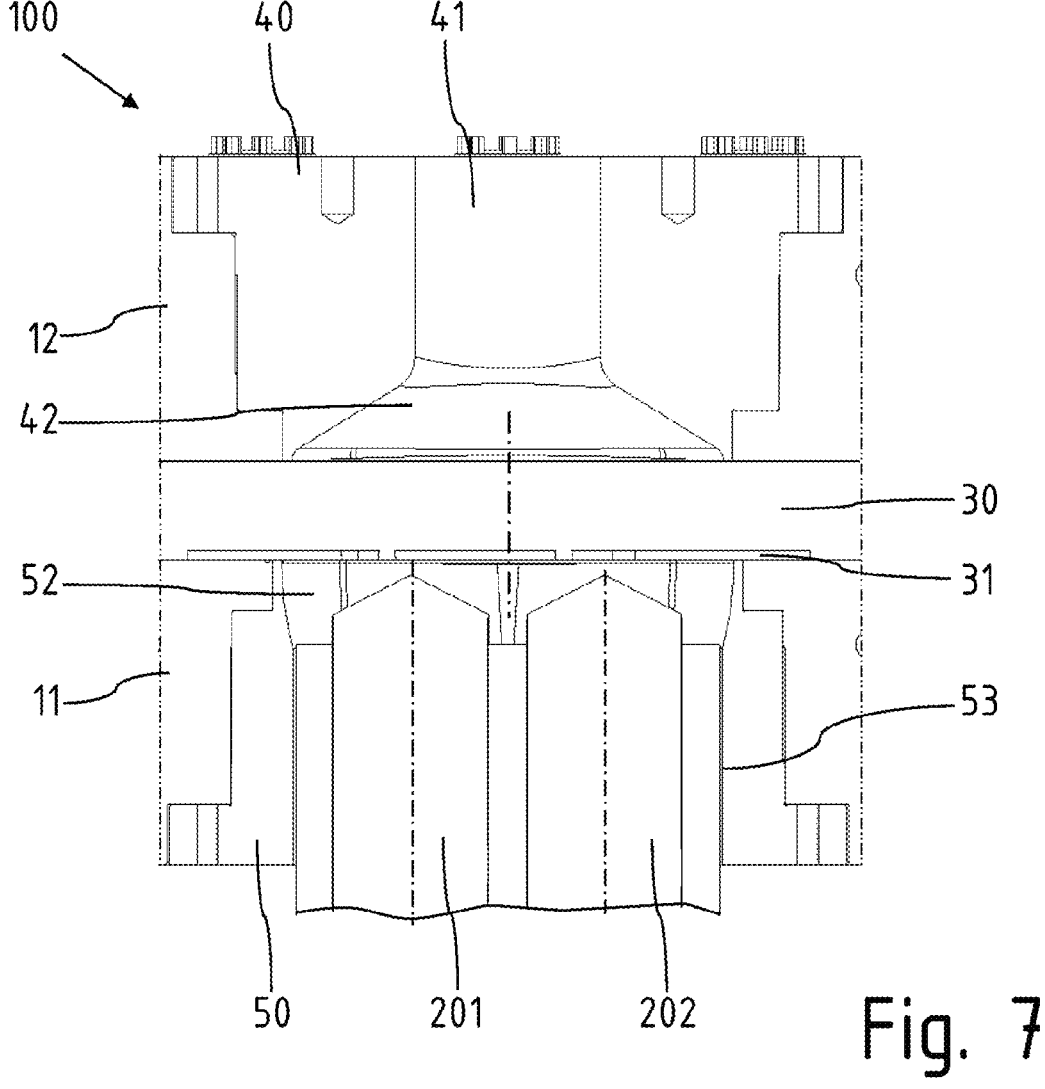
FIG. 7 shows a top view of the cutting plane from FIG. 6.

FIG. 7 shows a section of a plan view of the cutting plane from FIG. 6 in order to show once again how the funnel section 52 widens slightly convex outwards in front of the screen wheel 30 when viewed in the direction of flow. The shaping not only serves to distribute the plastic melt over a larger screen surface on the screen wheel 30, but is also optimized to avoid adhering wall flows, since in the processing of PVC, plastic portions remaining longer in the flow chamber are chemically decomposed and can reduce the quality of the filtered PVC plastic melt.

Figure 8:
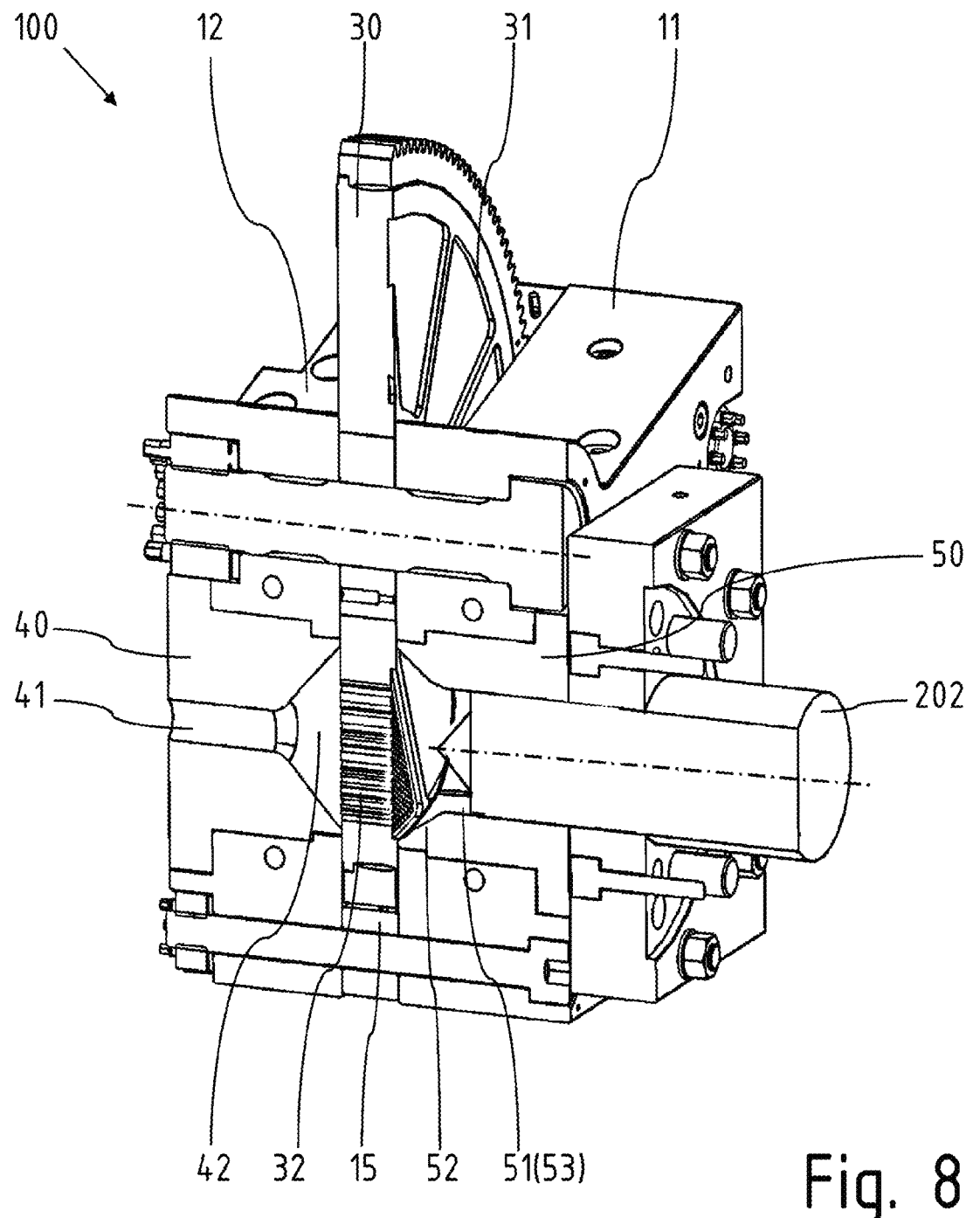
FIG. 8 shows a perspective cross-sectional representation of a vertical cutting plane through the filter device.

As the perspective cross-sectional representation of a vertical cutting plane through the filter device in FIG. 8 shows, the extruder screws 202 protrude far into the inlet melt pocket 51 after the twin screw extruder has been assembled on the filter device 100. Thus, the inlet melt pocket 51 with its twin extruder screw receptacle 53 functionally forms the front part of a twin screw extruder, although from a design point of view it is part of the filter device 100.

The screw tips of the extruder screws 202 are guided to almost directly in front of the screen wheel 30 with its screen elements 32, so that beyond the screw tips only a very short flow distance has to be bridged until the melt passes through the screen element 32 and is then compressed again in the tapered funnel section 42 and discharged through the outlet channel 41.

Figure 9A:
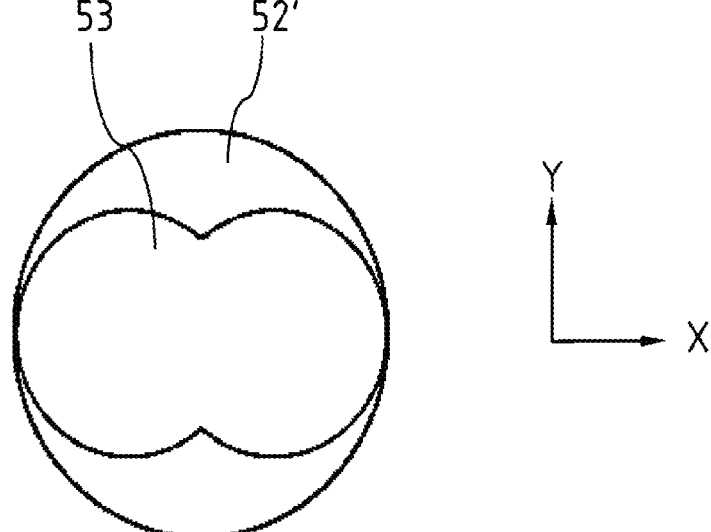
FIG. 9A shows the size distribution between a twin extruder tube receptacle and a cylindrical funnel section according to the prior art.

FIG. 9A shows the size distribution between a twin extruder screw receptacle 53 and a funnel section 52', which is designed in such a way that the shape of the horizontal figure of eight, which is determined by the adjacent and intermeshing twin screws, is transferred into a cylindrical flow channel. This has two disadvantages: the diameter of the funnel section 52' is determined by the width of the "horizontal figure eight" and determines the necessary screen size on the screen wheel. On the other hand, there is almost no change in flow in the X direction, but there is a change in the Y direction, so that the uneven flows in the transition area can lead to disadvantages such as dead zones and the disadvantageous influence of shear forces on the melt.

Figure 9B:
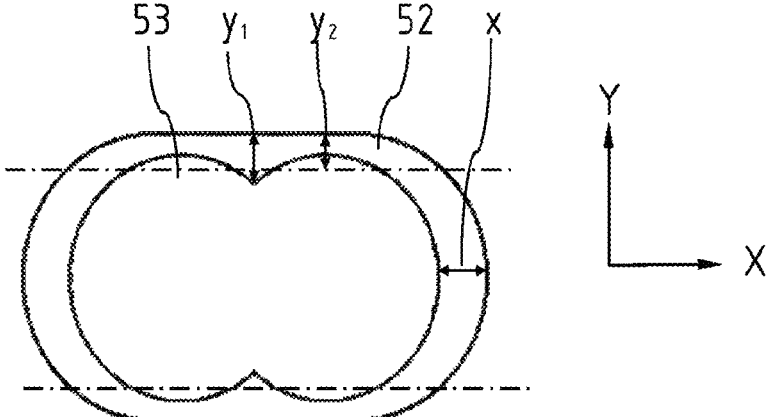
FIG. 9B shows the size distribution between the twin extruder screw receptacle and the funnel section of the invention.

FIG. 9B shows the twin extruder screw receptacle 53 with the funnel section 52 in the channel bushing of the invention in the same size. The expansion in the X direction is approximately the same as the largest expansion in the Y direction, so that the flow from the extruder to the screen point is widened much more evenly here.

In this case, the expansion in the Y direction may be dimensioned in such a way that $y_1$ is assumed to be the largest expansion in the Y direction in the middle of the twin extruder screw receptacle 53 and is equated with the expansion x. Alternatively, a mean value $y_2$, which is represented as a dashed line, can be used as a reference.

As a result, the maximum height of the flow channel, which according to FIG. 9B emerges from the funnel section 52, is 30% lower in FIG. 9A with a similar cross-section as that of the funnel section 52' in FIG. 9A. In order to achieve the same filtering effect, a screen wheel with a smaller diameter and consequently a smaller filter device can be chosen.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A filter device for PVC plastic melt to connect to a twin screw extruder, the filter device comprising:

a housing that has at least an inlet block with at least one inlet channel, an outlet block with at least one outlet channel;

at least one spacer element arranged between the inlet block and the outlet block;

a screen wheel that is rotatable in the housing and is at least partially arranged between the inlet block and the outlet block and has at least two screen points that are each adapted to be positioned between the inlet channel and the outlet channel and in each of which at least one screen element is insertable through which plastic melt is adapted to flow; and a drive device to rotate the screen wheel in the housing, wherein the inlet channel is formed, at least in part, in an inlet melt pocket in the inlet block, the inlet melt pocket having a twin extruder screw receptacle which extends into the inlet block, which the twin extruder screw receptacle being shaped so as to accommodate two screw tips of two extruder screws that are arranged next to one another, and the inlet melt pocket also having a first funnel section that extends from an end of the twin extruder screw receptacle, such that the inlet channel widens at the first funnel section, the first funnel section having an oval or elongated hole shape, and the first funnel section opening in front of the screen wheel, and wherein the outlet channel is formed, at least in part, in an outlet melt pocket in the outlet block, which tapers in a direction of flow from a second funnel section facing the screen wheel.

2. The filter device according to claim 1, wherein the twin extruder screw receptacle on the inlet melt pocket is formed by two laterally intersecting, parallel cylinder holes, a cross-section of which has a shape of a horizontal figure eight.

3. The filter device according to claim 2, wherein the first funnel section has a circumferentially equal funnel angle.

4. The filter device according to claim 2, wherein in the first funnel section, the cross-section of the twin extruder screw receptacle expands in an X-direction leading through centers of both extruder screws to a same extent as in the Y-direction with respect to a dimension in a middle of the twin extruder screw receptacle.

5. The filter device according to claim 2, wherein in the first funnel section, the cross-section of the twin extruder screw receptacle extends in an X-direction leading through centers of both extruder screws to a same extent it widens as in the Y-direction, referring to a mean value at an upper and/or lower edge of the twin extruder screw receptacle.

6. The filter device according to claim 1, wherein the inlet melt pocket is formed in a channel bushing detachably connected to the inlet block.

7. The filter device according to claim 1, wherein the outlet melt pocket is formed in a channel bushing detachably connected to the outlet block.

8. The filter device according to claim 1, wherein the inlet block and/or the outlet block are traversed by at least one flow channel for liquid heating.

9. The filter device according to claim 1, wherein a top of the housing has at least one opening area in which the screen wheel protrudes from the housing, so that in the at least one opening area, at least one screen point on the screen wheel is accessible from outside the housing.

10. A twin screw extruder for PVC processing, the twin screw extruder comprising an extruder housing with an extruder bore in which two parallel rotary-driven extruder screws are arranged, wherein the extruder screws extend into an end section of the extruder bore which is in flow connection with an outlet channel, and wherein the extruder housing is connected to a filter device according to claim 1, and wherein the inlet melt pocket of the filter device forms the end section of the extruder bore.

11. The twin screw extruder according to claim 10, further comprising two tip extension elements attached to a front of the extruder screws and extending into the twin extruder screw receptacle.

12. The filter device according to claim 6, wherein the channel bushing is inserted into an opening in a side wall of the inlet block.

* * * * *